United States Patent
Hess et al.

(10) Patent No.: US 11,474,272 B2
(45) Date of Patent: Oct. 18, 2022

(54) METHODS AND SYSTEMS FOR IDENTIFYING AND PLUGGING SUBTERRANEAN CONDUITS

(71) Applicant: HALLIBURTON ENERGY SERVICES, INC., Houston, TX (US)

(72) Inventors: Joe Eli Hess, Richmond, TX (US); Andrew John Cuthbert, Spring, TX (US); Arash Haghshenas, Houston, TX (US); Ronald Wayne Courville, Richmond, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 147 days.

(21) Appl. No.: 15/310,609

(22) PCT Filed: May 16, 2014

(86) PCT No.: PCT/US2014/038430
§ 371 (c)(1),
(2) Date: Nov. 11, 2016

(87) PCT Pub. No.: WO2015/175000
PCT Pub. Date: Nov. 19, 2015

(65) Prior Publication Data
US 2017/0082768 A1 Mar. 23, 2017

(51) Int. Cl.
*E21B 33/13* (2006.01)
*G01V 1/50* (2006.01)
(Continued)

(52) U.S. Cl.
CPC ............... *G01V 1/50* (2013.01); *E21B 33/13* (2013.01); *E21B 47/092* (2020.05); *E21B 47/10* (2013.01);
(Continued)

(58) Field of Classification Search
CPC ................... E21B 47/02208; E21B 33/13
(Continued)

(56) References Cited

U.S. PATENT DOCUMENTS 3,386,504 A * 6/1968 Kunetka ............... E21B 43/243
166/245
3,734,489 A * 5/1973 Milly ....................... G01V 5/02
436/29
(Continued)

FOREIGN PATENT DOCUMENTS

| EP | 2180140 | 10/2001 |
|----|---------|---------|
| EP | 1965021 | 9/2008 |

OTHER PUBLICATIONS

Canadian Application Serial No. 2,945,738, First Office Action, dated Sep. 22, 2017, 4 pgs.
(Continued)

*Primary Examiner* — Steven A MacDonald
(74) *Attorney, Agent, or Firm* — Delizio, Peacock, Lewin & Guerra (57) ABSTRACT

A method includes collecting seismic survey data and processing the seismic survey data to identify subterranean conduit coordinates. The method also includes performing a conduit plugging operations using the identified subterranean conduit coordinates. A related system includes at least one seismic source and at least one seismic receiver to collect seismic survey data in response to at least one shot fired by the at least one seismic source. The system also includes a processing unit in communication with the at least one seismic receiver. The processing unit analyzes the collected seismic survey data to identify subterranean conduit coordinates for use with conduit plugging operations.

17 Claims, 4 Drawing Sheets

(51) Int. Cl.
  *E21B 47/10* (2012.01)
  *G01V 1/30* (2006.01)
  *E21B 47/092* (2012.01)
  *E21B 49/00* (2006.01)
  *G01V 1/00* (2006.01)
  *G01V 1/28* (2006.01)
  *G01V 1/52* (2006.01)

(52) U.S. Cl.
  CPC .............. *E21B 49/00* (2013.01); *G01V 1/005* (2013.01); *G01V 1/284* (2013.01); *G01V 1/301* (2013.01); *G01V 2001/526* (2013.01); *G01V 2210/64* (2013.01)

(58) Field of Classification Search
  USPC .......................................................... 367/81
  See application file for complete search history.

(56) References Cited

U.S. PATENT DOCUMENTS

| | | | |
|---|---|---|---|
| 4,207,619 A | 6/1980 | Klaveness | |
| 4,329,647 A * | 5/1982 | Freedman | E21B 47/02 324/323 |
| 4,458,767 A * | 7/1984 | Hoehn, Jr. | E21B 7/04 166/255.1 |
| 4,465,140 A * | 8/1984 | Hoehn, Jr. | E21B 7/04 166/381 |
| 4,480,701 A * | 11/1984 | Baldwin | E21B 47/022 175/45 |
| 4,697,650 A * | 10/1987 | Fontenot | E21B 49/003 175/50 |
| 4,791,373 A * | 12/1988 | Kuckes | G01V 3/26 166/66.5 |
| 5,103,920 A * | 4/1992 | Patton | E21B 47/02216 175/45 |
| 5,671,136 A * | 9/1997 | Willhoit, Jr. | G01V 1/30 702/18 |
| 6,094,401 A * | 7/2000 | Masak | G01V 1/133 181/106 |
| 6,302,204 B1 | 10/2001 | Reimers et al. | |
| 7,551,516 B2 * | 6/2009 | Harmon | G01V 1/42 367/25 |
| 2003/0062155 A1 | 4/2003 | Summers | |
| 2003/0168213 A1 * | 9/2003 | Harmon | E21B 43/11857 166/250.01 |
| 2004/0238218 A1 * | 12/2004 | Runia | E21B 10/60 175/57 |
| 2006/0077757 A1 * | 4/2006 | Cox | G01V 1/40 367/25 |
| 2008/0316860 A1 * | 12/2008 | Muyzert | G01V 1/42 367/25 |
| 2010/0096125 A1 * | 4/2010 | Beasley | E21B 43/26 166/254.1 |
| 2011/0272147 A1 * | 11/2011 | Beasley | E21B 43/26 166/250.1 |
| 2012/0061084 A1 * | 3/2012 | Sweatman | E21B 41/0064 166/305.1 |
| 2012/0145463 A1 | 6/2012 | Lee et al. | |
| 2013/0079935 A1 * | 3/2013 | Kabannik | E21B 43/26 700/282 |
| 2013/0140037 A1 * | 6/2013 | Sequeira, Jr. | E21B 41/0092 166/369 |
| 2014/0345856 A1 * | 11/2014 | Elmbo | E21B 7/00 166/245 |
| 2015/0021029 A1 * | 1/2015 | Abrant | E21B 29/06 166/298 |

OTHER PUBLICATIONS

Singapore Application Serial No. 11201608580U, Examination Report, dated Oct. 16, 2017, 3 pgs.
PCT International Search Report and Written Opinion, dated Feb. 12, 2015, Appl No. PCT/US2014/038430, "Methods and Systems for Identifying and Plugging Subterranean Conduits," Filed May 16, 2014, 19 pgs.
Hammack, R. W., et al., "New Stategies for Finding Abandoned Wells at Proposed Geologic Storage Sites for CO2," DOE/NETL-IR-2007-207, National Energy Technology Laboratory, 626 Cochrans Mill Rd., Pittsburgh, PA 15236, 12 pgs.
GB Examination Report, dated Dec. 9, 2016, Appl No. GB1617456. 7, "Methods and Systems for Identifying and Plugging Subterranean Conduits," Filed May 16, 2014.
AU Examination Report, dated Feb. 6, 2017, Appl No. 2014394076, "Methods and Systems for Identifying and Plugging Subterranean Conduits," Filed May 16, 2014.
Canadian Application Serial No. 2,945,738; Notice of Allowance; dated Jun. 12, 2018, 1 page.
Norwegian Application Serial No. 20161643; First Office Action; dated Jul. 25, 2018, 7 pages.
Norwegian Application Serial No. 20161643; Second Office Action; dated Jul. 2, 2019, 2 pages.
Buckingham, et al., "Field Testing of Remote Sensor Gas Leak Detection Systems", Southwest Research Institute, Project No. 18.10485, Dec. 2004, 263 pages, Prepared for U.S. Department of Energy and U.S. Department of Transportation, retrieved on Sep. 8, 2020 from https://digitalcommons.unl.edu/cgi/viewcontent.cgi?article=1057&context=usdot.
CBS News, "27,000 Abandoned Gulf Oil Wells May Be Leaking", The Associated Press, Jul. 7, 2010, 6 pages, retrieved on Sep. 9, 2020 from http://www.cbsnews.com/news/27000-abandoned-gulf-oil-wells-may-be-leaking/.
Kotler, "Planet Sludge: Millions of Abandoned, Leaking Oil Wells and Natural-Gas Wells Destined to Foul Our Future", *Ecohearth, Ernst v. EnCana Corporation*, Sep. 9, 2012, 2 pages, retrieved on Sep. 8, 20 from https://www.ernstversusencana.ca/planet-sludge-millions-of-abandoned-leaking-oil-wells-and-natural-gas-wells-destined-to-foul-our-future/.
United Arab Emirates Application Serial No. 1115/2016; Non Final Office Action; dated May 31, 2021, 6 pages.

* cited by examiner

METHODS AND SYSTEMS FOR IDENTIFYING AND PLUGGING SUBTERRANEAN CONDUITS

BACKGROUND

There are approximately 27,000 suspected oil wells in the Gulf of Mexico which are leaking oil, 2.5 million wells in the United States which are abandoned and not permanently capped, and 20-30 million of such wells globally. Some of these wells date back to the early 20th century with little or no data for locating the wells to enable proper intersection and abandonment of the wells. Tertiary recovery in some fields may be economically feasible after proper well plugging and abandonment has been undertaken for all conduits in the field.

Some recent efforts to locate improperly abandoned wells make use of electromagnetic surveys to detect subterranean metal and/or chemical spectrometry to detect gas leaks. See e.g., Hammack et al., New Strategies For Finding Abandoned Wells At Proposed Geologic Storage Sites for $CO_2$, DOE/NETL-IR-2007-207, and Buckingham et al., Field Testing Of Remote Sensor Gas Leak Detection Systems Final Report (2004), United States Department of Transportation—Publications & Papers, Paper 58. However, these techniques alone are not sufficiently accurate to guide relief well and related well plugging operations. For example, some of these wells have had surface casing cut off to a depth some meters below ground level, which precludes the use of metal detection to locate the well. Further, due to corrosion, some of the abandoned wells may not have enough casing material left to enable metal detection.

BRIEF DESCRIPTION OF THE DRAWINGS

Accordingly, there are disclosed in the drawings and the following description various methods and systems for identifying and plugging subterranean conduits. In the drawings.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are various methods and systems for identifying and plugging subterranean conduits. In at least some embodiments, seismic survey data is collected and used to identify subterranean conduit coordinates. While not required, such conduits typically correspond to abandoned wells. Once subterranean conduit coordinates are known, relief well and plugging operations are performed. Plugging such conduits may improve tertiary oil/gas recovery efforts and enables compliance with government regulations to plug abandoned or orphaned wells. Many of such abandoned wells are "lost" as they no longer connect to the surface, and they cannot be accurately detected using previously proposed techniques such as electromagnetic (EM) survey and chemical spectroscopy.

In at least some embodiments, the disclosed methods and systems combine seismic survey technology with other sensor-based technology to identify subterranean conduit coordinates. For example, a seismic survey location may be determined from records, from EM surveys, and/or from chemical spectroscopy. Once the seismic survey location is determined, seismic sources and receivers are deployed to collect seismic survey data. The collected seismic survey data is analyzed to identify subterranean conduits. For example, such conduits may be identified by comparing primary waves (P-waves) and shear waves (S-waves), by identifying conduit patterns that do not follow natural sedimentary rock patterns, or by applying one or more rock pattern filters such that the subterranean conduits are identified. It should be appreciated that there are many variations of abandoned wells or other subterranean conduits. Some subterranean conduits may have metal casing or cement while others do not. Further, the composition of subterranean conduits may vary. Further, the continuity of subterranean conduits may vary. Regardless, subterranean conduit variations will still vary from the surrounding natural sedimentary rock patterns, and can thus be identified.

Further, in at least some embodiments, the disclosed methods and systems combine seismic survey technology and/or other sensor-based technology to identify plug point coordinates. The plug point coordinates correspond to the coordinates along a conduit trajectory at which a plug is to be applied. Preferred plug point coordinates may be, for example, where a conduit intercepts the top bed boundary of a producing formation layer. Other plug point coordinates and/or multiple plug point coordinates are possible. To determine plug point coordinates, bed boundaries and/or other formation properties are determined from the seismic survey data and/or from other available log data (e.g., a resistivity log, a porosity log, a lithography log, etc.). Such logs may be obtained from a new or existing well in the vicinity of the subterranean conduit to be plugged. Further, such logs may be obtained while drilling a relief well to intercept a subterranean conduit for the purpose of performing plugging operations. Thus, plug point coordinates may be determined before relief well drilling begins or during relief well drilling. Further, predetermined plug point coordinates may be adjusted as new log data is collected during relief well drilling.

Figure 1:
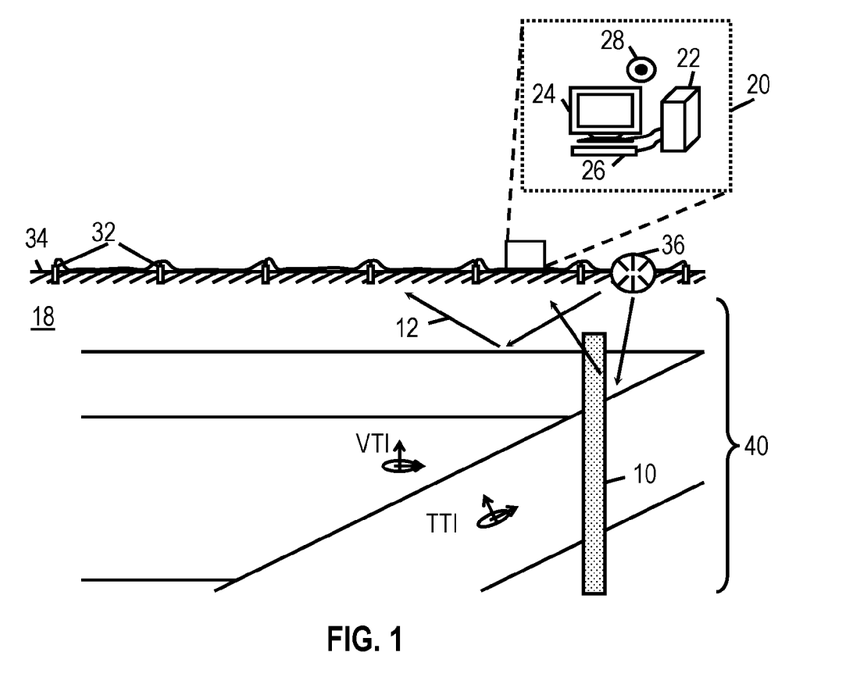
FIG. 1 shows an illustrative seismic survey environment.

The disclosed systems and methods are best understood when described in an illustrative usage context. Accordingly, FIG. 1 shows an illustrative seismic survey environment, in which surveyors position an array of seismic receivers 32 in a spaced-apart arrangement on the earth's surface 34 to detect seismic waves. As an example, the array of seismic receivers 32 may extend for a couple of kilometers in each direction, and may be moved after each series of shots until the whole survey region has been covered. The position, size, and movement of the array of seismic receivers 32 may depend on available records, EM surveys, and/or chemical spectroscopy surveys that provide some information on the whereabouts of an abandoned well.

The seismic receivers 32 communicate wirelessly or via cable to a computer system 20 that receives, processes, and stores the seismic survey data collected by the receivers 32. In some embodiments, the computer system 20 may also control seismic survey operations such as controlling which seismic source(s) 36 is used for a given shot or series of shots. For example, to perform a seismic survey, seismic source(s) 36 (e.g., vibrator trucks) is triggered at multiple positions ("shot locations") to generate seismic energy waves that propagate through the earth 18. Each shot results in reflected arrivals 12 that reflect from acoustic impedance discontinuities to reach the receivers 32. Illustrative discontinuities include faults, boundaries between formation beds, and boundaries between formation fluids. The discontinuities are visible in the subsurface structure representation derived from the seismic survey data or are otherwise identified from the seismic signal data. Reflected arrivals 12 can also be used to identify coordinates of a subterranean conduit 10 corresponding to an abandoned well. Such subterranean conduits 10 may include various detectable discontinuities (e.g., due to cement, casing, fluid, etc.). While the subterranean conduit 10 of FIG. 1 is shown to be vertically oriented, it should be understood that the orientation and trajectory of such conduits may vary.

In the illustrative subsurface structure of FIG. 1, the earth 18 has various layers 40 including three relatively flat formation layers and two dipping formation layers of varying composition and hence varying speeds of sound. For each layer, the speed of sound can be isotropic (i.e., the same in every direction) or anisotropic. Due to the manner in which rocks are formed, nearly all anisotropic formations are transversely isotropic. In other words, the speed of sound in anisotropic formations is the same in every "horizontal" direction, but is different for sound traveling in the "vertical" direction. Note, however, that geological activity can change formation orientations, turning a vertical transversely isotropic ("VTI") formation layer into a tilted transversely isotropic ("TTI") formation layer. In FIG. 1, the third flat layer is VTI, while the first dipping formation layer is TTI. In order to process seismic survey data correctly, a suitable model representing the earth 18 and formations 40 should be used. Such models may vary for different reservoirs.

Though some large-scale structures can often be perceived from a direct examination of recorded seismic arrival signals, such seismic survey data is preferably processed to remove distortion and reveal finer detail in the subsurface image. Thus, computer system 20 or similar systems perform various processing operations to detect subsurface details including the coordinates and trajectory of conduit 10.

In at least some embodiments, the computer system 20 includes a processing unit 22 that performs analysis of seismic survey data by executing software or instructions obtained from a local or remote non-transitory computer-readable medium 28. The computer system 20 also may include input device(s) 26 (e.g., a keyboard, mouse, touchpad, etc.) and output device(s) 24 (e.g., a monitor, printer, etc.). Such input device(s) 26 and/or output device(s) 24 provide a user interface that enables an operator to interact with the seismic survey components and/or software executed by the processing unit 22. For example, the computer system 20 may enable an operator may select analysis options, to view collected seismic survey data, to view analysis results, and/or to perform other tasks.

Because seismic survey data processing involves migration (a conversion of the measured time-dependent waveforms into position-dependent seismic information), the quality of the resulting subsurface image is highly dependent on the accuracy of the estimated seismic wave propagation speeds. A subsurface velocity model is used during the migration step to specify how this propagation speed varies as a function of position. "Velocity analysis" is the term used to describe the act of extracting velocity information from seismic data. One way to perform velocity analysis is to begin with an assumed velocity model, to migrate the seismic data based on this model, and to analyze the residual curvature ("residual moveout") of the migrated seismic data to determine errors in the assumed velocity model. The velocity model can then be updated and the process repeated until the model converges. This approach to velocity analysis is called "migration velocity analysis" or "MVA". Various seismic survey data processing and velocity models are available and may be used to identify subterranean conduits or other abandoned well management operations. Further, various configurations of seismic sources and seismic receivers may be employed. Further, various processing system strategies (e.g., multi-processor and parallel processing schemes) are available.

Figure 2:
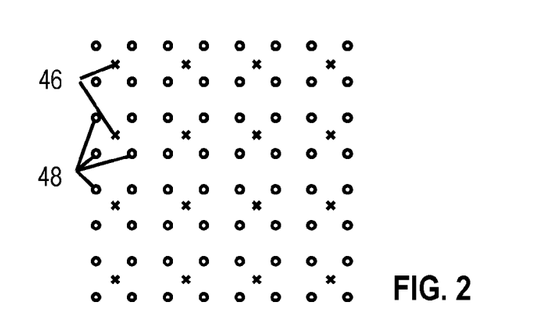
FIG. 2 shows an illustrative seismic source and receiver geometry.

FIG. 2 shows an illustrative geometry for source positions 46 and receiver positions 48 (e.g., corresponding to seismic source 36 and seismic receivers 32), as they might be seen from an overhead view. Viable seismic survey geometries are infinite in variety, and can be gathered on a sector-by-sector basis, a rolling geometry basis, a moving-array basis, and various combinations thereof. Accordingly, the number of receiver signals acquired in response to each shot fired is fairly large, and when the number of shot firings is taken into account, the resulting number of traces can easily reach into the millions.

Figure 3:
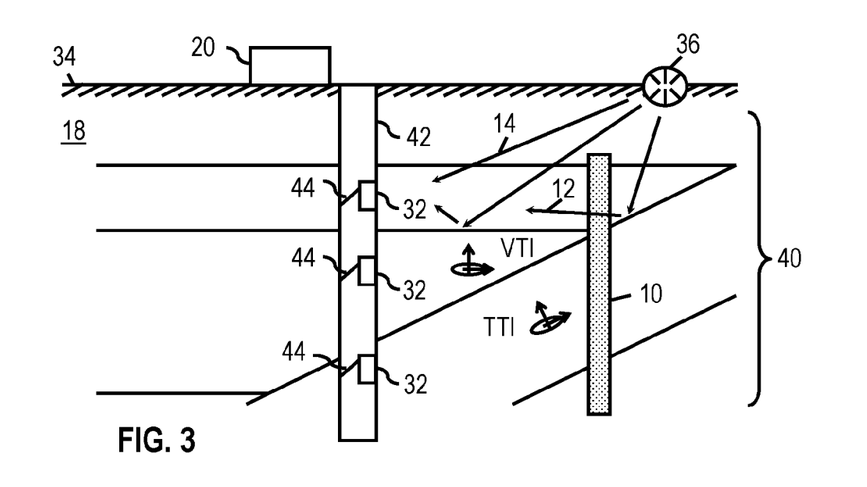
FIG. 3 shows another illustrative seismic survey environment.

FIG. 3 shows another illustrative seismic survey environment, in which seismic source(s) 36 is at earth's surface and seismic receivers 32 are in a spaced-apart arrangement within a borehole 42. The configuration of FIG. 3 is referred to as vertical seismic profiling (VSP), and can be used to perform VSP check-shot and walkaway surveys. As shown, the seismic receivers 32 may be fixed in place by anchors 44 to facilitate sensing seismic waves. In different embodiments, the seismic receivers 32 may be part of a logging-while-drilling (LWD) tool string or wireline logging tool string. Further, the seismic receivers 32 communicate wirelessly or via cable to a computer system 20 at earth's surface 34, where the computer system 20 receives, processes, and stores seismic survey data as described previously. In FIG. 3, reflected arrivals 12 and/or direct arrivals 14 may be used to identify coordinates of a subterranean conduit 10 corresponding to an abandoned well. Again, such subterranean conduits 10 may include various detectable discontinuities (e.g., cement, casing, fluid, etc.), and their orientation and trajectory may vary. The illustrative representation of earth 18 and formations 40 in FIG. 3 (with three relatively flat formation layers and two dipping formation layers of varying composition and hence varying speeds of seismic waves) is the same as the representation given for FIG. 1. The number of layers, the layer dimensions, and layer attributes (e.g., VTI or TTI) may vary for different survey environments, and such variations may be accounted for when processing seismic survey data to identify the coordinates of subterranean conduits 10.

FIGS. 1-3 only show some of the possible seismic survey configurations that can be used for abandoned well management operations. For example, other seismic survey configurations may deploy a seismic source(s) 36 downhole, while seismic receivers 32 are deployed at earth's surface (i.e., a reverse VSP configuration). Further, some seismic survey configurations may both deploy seismic source(s) 36 and seismic receivers 32 downhole (e.g., in single well, multi-well, or cross-well deployments).

Figure 4A:
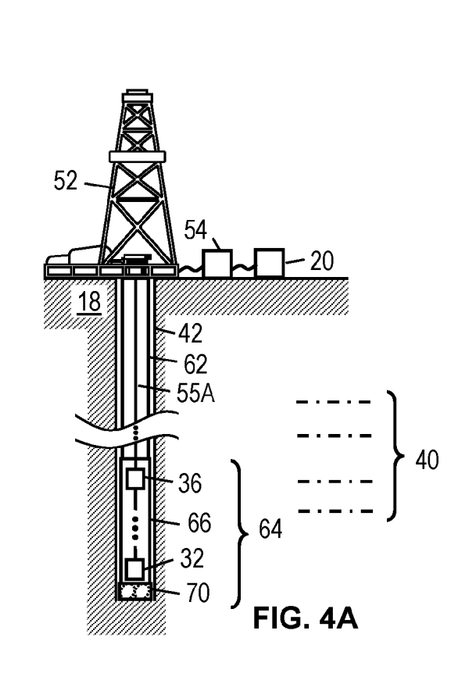
FIG. 4A shows an illustrative logging-while-drilling (LWD) environment.

FIG. 4A shows an illustrative logging-while-drilling (LWD) environment. In FIG. 4A, a drilling assembly 52 enables a wired drill string 62 to be lowered and raised in a borehole 42 that penetrates formations 40 of the earth 18. At the lower end of the wired drill string 62, a bottomhole assembly 64 with a drill bit 70 removes material and penetrates formations 40 using known drilling techniques. The bottomhole assembly 70 also includes a logging tool 66 with seismic source(s) 36 and/or seismic receiver(s) 32 to obtain seismic survey data as described herein. The logging tool 66 may also include electronics for data storage, communications, etc. The seismic survey data obtained by seismic receiver(s) 32 is conveyed to earth's surface and/or is stored by the logging tool 66. In either case, collected seismic survey data may be analyzed to determine properties of formations 40 and/or subterranean conduit coordinates.

In FIG. 4A, a cable 55A is represented. The cable 55A may take different forms and includes embedded electrical conductors and/or optical waveguides (e.g., fibers) to enable transfer of power and/or communications between the bottomhole assembly 64 and earth's surface. The cable 55A may be integrated with, attached to, or inside the drill string 62. In at least some embodiments, cable 55A may be supplemented by or replaced at least in part by mud pulse telemetry or other wireless communication techniques. In FIG. 1A, an interface 14 at earth's surface receives the seismic survey data via cable 55A or another telemetry channel and conveys the seismic survey data to a computer system 20, which may perform seismic survey data analysis as described herein.

Figure 4B:
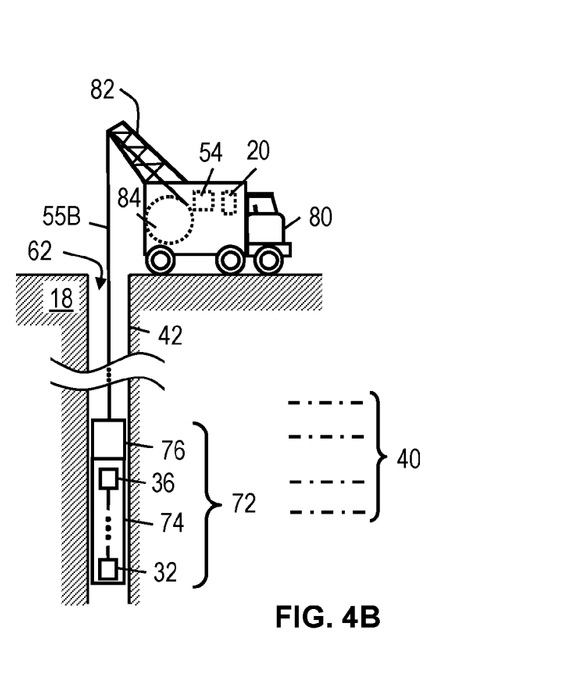
FIG. 4B shows an illustrative wireline logging environment.

At various times during the drilling process, the drill string 62 shown in FIG. 1A may be removed from the borehole 42. With the drill string 62 removed, wireline logging operations may be performed as shown in the wireline logging survey environment of FIG. 1B. In FIG. 1B, a wireline logging string 72 is suspended in borehole 42 that penetrates formations 40 of the earth 18. For example, the wireline logging string 72 may be suspended by a cable 55B having conductors and/or optical fibers for conveying power to the wireline logging string 72. The cable 55B may also be used as a communication interface for uphole and/or downhole communications. In at least some embodiments, the cable 55B wraps and unwraps as needed around cable reel 84 when lowering or raising the wireline logging string 72. As shown, the cable reel 84 may be part of a movable logging facility or vehicle 80 having a cable guide 82.

The wireline logging string 72 includes logging tool(s) 76 and a logging tool 74 with seismic source(s) 36 and/or seismic receiver(s) 32 to collect seismic survey data. The logging tool 74 may also include electronics for data storage, communication, etc. The seismic survey data collected by logging tool 74 is conveyed to earth's surface (e.g., via cable 55B) and/or is stored by the logging tool 74. At earth's surface, a surface interface 14 receives the seismic survey data and conveys the seismic survey data to a computer system 20 for analysis.

In at least some embodiments, collecting seismic survey data to identify subterranean conduit coordinates involves LWD and/or wireline logging operations as described for FIGS. 4A and 4B. Seismic survey data may also be used to identify plug point coordinates. Additionally or alternatively, LWD and/or wireline logging operations may collect non-seismic logs (e.g., a resistivity log, a porosity log, a lithography log, etc.). To identify plug point coordinates, bed boundaries and/or other formation properties are determined from the seismic survey data or from other available log data. Such logs may be obtained from a well in the vicinity of a subterranean conduit to be plugged. In some embodiments, such logs may be obtained while drilling a relief well to intercept the subterranean conduit for the purpose of performing plugging operations. Thus, plug point coordinates may be determined before relief well drilling begins or during relief well drilling. Further, predetermined plug point coordinates may be adjusted as new log data is collected during relief well drilling or during wireline logging operations in a relief well.

Figure 5:
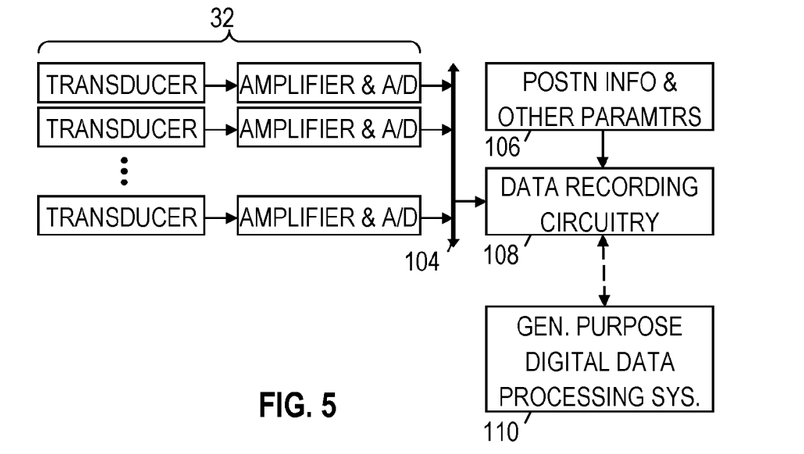
FIG. 5 shows an illustrative seismic survey recording system.

FIG. 5 shows an illustrative seismic survey recording system with the seismic receivers 32 coupled to a bus 104 to communicate digital signals to data recording circuitry 108. Each receiver 32 is shown to include a transducer (to convert a reflected arrival 12 or direct arrival 14 to a corresponding voltage signal or current signal), an amplifier, and an analog-to-digital converter (A/D). Position information sensors 106 (and optionally sensors for other parameters) are also coupled to the data recording circuitry 108 to enable the data recording circuitry 108 to store additional information useful for interpreting the recorded data. Such additional information can include the precise locations of the receivers and source firings, source waveform characteristics, digitization settings, detected faults in the system, etc.

In at least some embodiments, the seismic sensors 32 each include multi-axis accelerometers and/or geophones and, in some environments, hydrophones, each of which may take high-resolution samples (e.g., 16 to 32 bits) at a programmable sampling rate (e.g., 400 Hz to 1 kHz). The recording circuitry 108 stores the data streams from seismic receivers 32 on a non-volatile storage medium such as a storage array of optical or magnetic disks. The data is stored in the form of (possibly compressed) seismic traces, each trace being the signal detected and sampled by a given receiver in response to a given shot. Again, the associated shot and receiver positions may also be stored for use with seismic survey data analysis. Illustrative seismic signals are shown in FIG. 6, where the signals indicate some measure of seismic wave energy as a function of time (e.g., displacement, velocity, acceleration, pressure).

Seismic survey data can be partitioned in different ways to make processing and analysis more feasible. When partitioned based on a given parameter, each data partition is called a "gather". For example, a "shot gather" is the group of traces recorded for a single firing of the seismic source. A "common midpoint gather" is the group of traces that have a midpoint within a defined region. "Image gathers" are partitions of the migrated ("image") data based on the given parameter. Thus "common offset image gathers" constitute partitions of the image data according to the distance between source and receiver, while "common angle image gathers" are partitioned according to the incidence (or reflection) angle of seismic energy at the image point. At one or more points in the image formation process, the gathers may be added together ("stacked") to obtain a combined data set, e.g., a final image of the subsurface structure.

A general purpose data processing system 110 (e.g., computer system 20) receives the acquired seismic survey data from the data recording circuitry 108 (e.g., part of surface interface 14). In some cases, the general purpose data processing system 110 is physically coupled to the data recording circuitry 108 and provides a way to configure the recording circuitry 108 and perform preliminary processing in the field. More typically, however, the general purpose data processing system 110 is located at a central computing facility with adequate computing resources for intensive processing. The seismic survey data can be conveyed to the central facility on physical media or via a computer network. In at least some embodiments, the general purpose data processing system 110 includes a user interface having a graphical display and a keyboard or other method of accepting user input, enabling users to view and analyze the subsurface structure images or other information derived from the seismic survey data.

Figure 6:
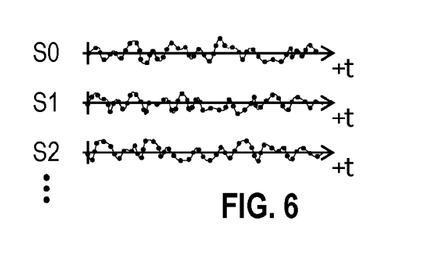
FIG. 6 shows illustrative seismic traces.
Figure 7:
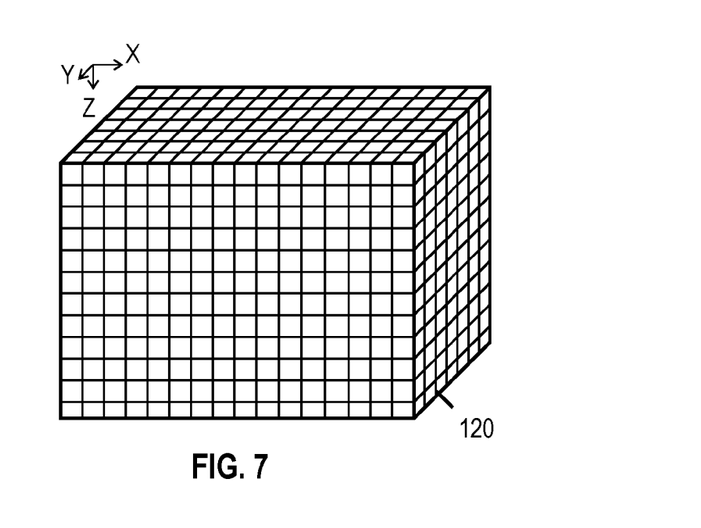
FIG. 7 shows an illustrative data volume in three dimensions.

The recorded seismic survey data is of little use when maintained in the format of FIG. 6. Although it is possible to plot the various recorded waveforms side by side in a plot that reveals large scale subsurface structures, such structures are distorted and finer structures cannot even be seen. Accordingly, the data is processed to create a data volume 120, i.e., a three dimensional array of data values such as that shown in FIG. 7. The data volume 120 represents some seismic attribute throughout the survey region. The three-dimensional array comprises uniformly-sized cells, each cell having a data value representing the seismic attribute for that cell. Various seismic attributes may be represented, and in some embodiments, each cell has multiple data values to represent multiple seismic attributes. Examples of suitable seismic attributes include reflectivity, acoustic impedance, acoustic velocity, and density. The volumetric data format readily lends itself to computational analysis and visual rendering, and for this reason, the data volume 120 may be termed a "three-dimensional image" of the survey region. Seismic survey data can also be used to generate one or more 2D images that render sufficient information to identify subterranean conduit coordinates, plug point coordinates, or other information used for abandoned well management operations.

Figure 8:
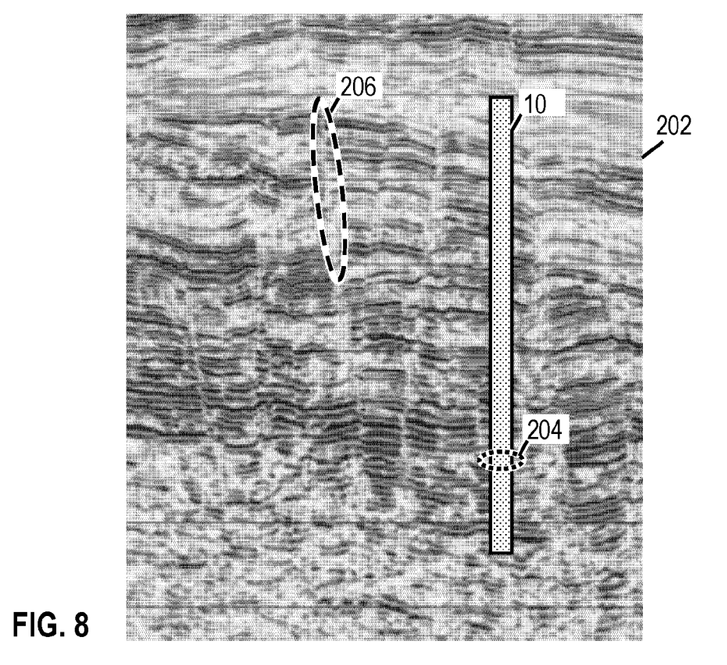
FIG. 8 shows an illustrative seismic logging image.

FIG. 8 shows an illustrative seismic logging image 202. In image 202, the structure of a formation is represented as light areas and dark areas. Further, faults 206 in the structure are visible in image 202 and a subterranean conduit 10 is represented. The representation of the subterranean conduit 10 in image 202 may vary with regard to color/contrast. Regardless, such a conduit 10 is detectable as the size, orientation, and formation characteristics will be different from other structures in image 202. For example, the conduit 10 may include a detectable amount of cement, metal casing, and/or gas/oil/water. Further, plug point coordinates 204 related to the subterranean conduit 10 are represented in image 202. Such plug point coordinates 204 are used to guide drilling of a relief well and/or other conduit plugging operations. While image 202 is a 2D image, it should be appreciated that 3D images may likewise be used to identify subterranean conduit coordinates, a conduit trajectory, and plug point coordinates. Further, it should be appreciated that some subterranean conduits 10 may not appear to be continuous as casing corrosion, formation shifts, imaging inaccuracies, and other effects may result in a discontinuous conduit. Even so, a discontinuous conduit can be distinguished from other structures in a formation and its coordinates determined accurately enough to support plugging operations.

Figure 9:
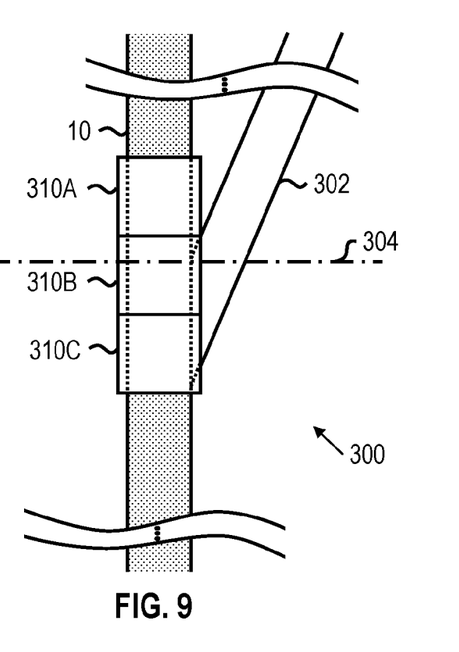
FIG. 9 shows an illustrative well plugging scenario.

FIG. 9 shows an illustrative well plugging scenario 300. In scenario 300, a relief well 302 has been drilled to intercept subterranean conduit 10 at predetermined or dynamically determined plug point coordinates. As described herein, subterranean conduit coordinates and/or plug point coordinates may be determined at least in part from seismic survey data. For scenario 300, the point at which the relief well 302 intercepts the conduit 10 is selected to be at or near bed boundary 304, which may correspond to the top boundary of an existing or intended producing formation layer. To select the plug point coordinates, seismic log data and/or other logs may be considered. Further, in some embodiments, EM scans may be performed as drilling of the relief well 302 progresses to determine the distance and/or direction from the relief well 302 to the subterranean conduit 10.

To plug the subterranean conduit 10, multiple stages of cement 310A-310C are injected in and around the subterranean conduit 10. For example, cement stage 310A may be injected first. After cement stage 310A has dried sufficiently, cement stage 310B is injected. Finally, after cement stage 310B has dried sufficiently, cement stage 310C is injected. Additional or fewer cement stages are possible. The result of the cementing operations of scenario 300 is that the subterranean conduit 10 is plugged at and around the bed boundary 304. As needed, a subterranean conduit 10 may be plugged at other locations along its trajectory. Such plugging operations may be repeated for multiple subterranean conduits 10 in a field to enable tertiary recovery operations and/or compliance with government regulations regarding abandoned wells.

Figure 10:
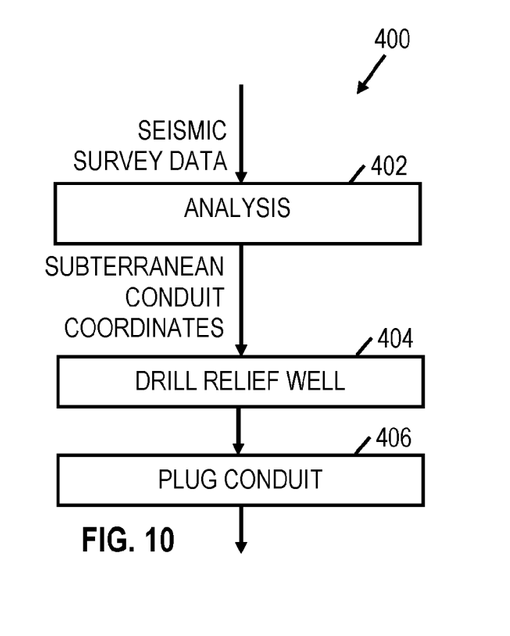
FIG. 10 shows an illustrative abandoned well management method.

FIG. 10 shows an illustrative abandoned well management method 400. In method 400, seismic survey data is analyzed at block 402 to identify subterranean conduit coordinates (e.g., geodetic coordinates or another coordinate system). The seismic survey data may be obtained from any of a number of different seismic survey configurations as described herein. Also, the processing and/or imaging of seismic survey data may vary as described herein. The seismic survey data analysis of block 402 may be performed by a computer system (e.g., computer system 20) executing software (e.g., Compass™, DecisionSpace®, or other well planning software) to output subterranean conduit coordinates and/or plug point coordinates. Using, at least in part, the coordinates obtained from block 402, a relief well is drilled at block 404. Once the relief well intercepts the subterranean conduit, plugging operations are performed at block 406 as described herein (see e.g., FIG. 9).

Embodiments disclosed herein include:

A: A method that comprises collecting seismic survey data, processing the seismic survey data to identify subterranean conduit coordinates, and performing a conduit plugging operation using the identified subterranean conduit coordinates.

B: A system that comprises at least one seismic source and at least one seismic receiver to collect seismic survey data in response to at least one shot fired by the at least one seismic source. The system also comprises a processing unit in communication with the at least one seismic receiver. The processing unit analyzes the collected seismic survey data to identify subterranean conduit coordinates for use with conduit plugging operations.

Each of the embodiments, A and B, may have one or more of the following additional elements in any combination. Element 1: further comprising recovering hydrocarbons from an active well installation in vicinity of the subterranean conduit after said performing a conduit plugging operation. Element 2: further comprising identifying a region of interest for collecting said seismic survey data based on a non-seismic survey. Element 3: the non-seismic survey corresponds to an electromagnetic survey or chemical spectroscopy survey. Element 4: performing a conduit plugging operation using the identified subterranean conduit coordinates comprises drilling a relief well to intersect the subterranean conduit. Element 5: further comprising identifying a formation layer of interest, and drilling the relief well to interest the subterranean conduit at or near a bed boundary corresponding to the formation layer of interest. Element 6: further comprising performing cementing operations via the relief well to plug the subterranean conduit. Element 7: processing the seismic survey data to identify subterranean conduit coordinates comprises identifying a two-dimensional trajectory of the subterranean conduit. Element 8: processing the seismic survey data to identify subterranean conduit coordinates comprises identifying a three-dimensional trajectory of the subterranean conduit. Element 9: processing the seismic survey data to identify subterranean conduit coordinates comprises applying at least one of conduit identification parameters or an earth model filter to the seismic survey data. Element 10: processing the seismic survey data to identify subterranean conduit coordinates comprises comparing primary wave data and shear wave data Element 11: one of at least one seismic source and the at least one seismic sensor is positioned downhole while the other is positioned at earth's surface. Element 12: the at least one seismic source and the at least one seismic receiver are positioned downhole. Element 13: the at least one seismic source and the at least one seismic receiver are positioned at earth's surface. Element 14: further comprising a drilling tool to receive the subterranean conduit coordinates and to drill a relief well to intersect the subterranean conduit. Element 15: further comprising a survey tool to identify a bed boundary of interest, wherein the relief well intersects the subterranean conduit at or near the bed boundary of interest for conduit plugging operations. Element 16: further comprising a cementing tool to perform cementing operations via the relief well to plug the subterranean conduit. Element 17: further comprising a non-seismic survey tool to identify a region of interest for collecting said seismic survey data. Element 18: further comprising a LWD tool or a wireline logging tool to adjust a downhole position of the at least one seismic source or the at least one seismic receiver. Element 19: further comprising an active well installation in vicinity of the subterranean conduit to recover hydrocarbons after said subterranean conduit is plugged.

Numerous variations and modifications will become apparent to those skilled in the art once the above disclosure is fully appreciated. It is intended that the following claims be interpreted to embrace all such variations and modifications.

What is claimed is:

1. A method that comprises:
converting seismic survey data from time-dependent waveforms to position-dependent seismic information with a subsurface velocity model;
determining acoustic impedance discontinuities in a rock formation from the position-dependent seismic information;
comparing the acoustic impedance discontinuities to natural rock patterns in a model representing the rock formation;
identifying, along a subterranean conduit, subterranean conduit coordinates and a plug point coordinate based on the comparing of the acoustic impedance discontinuities to the natural rock patterns in the model representing the rock formation; and
performing a conduit plugging operation using the identified subterranean conduit coordinates,
wherein performing the conduit plugging operation comprises:
identifying a formation layer of interest, and
drilling a relief well to intersect the subterranean conduit at a bed boundary corresponding to the formation layer of interest.

2. The method of claim 1, further comprising recovering hydrocarbons from an active well installation in the rock formation surrounding the subterranean conduit after said performing the conduit plugging operation.

3. The method of claim 1, further comprising identifying a region of interest for collecting said seismic survey data based on a non-seismic survey.

4. The method of claim 3, wherein the non-seismic survey corresponds to an electromagnetic survey or chemical spectroscopy survey.

5. The method of claim 1, further comprising performing cementing operations via the relief well to plug the subterranean conduit.

6. The method of claim 1, wherein identifying the subterranean conduit coordinates comprises identifying a two-dimensional trajectory of the subterranean conduit.

7. The method of claim 1, wherein identifying the subterranean conduit coordinates comprises identifying a three-dimensional trajectory of the subterranean conduit.

8. The method of claim 1, wherein identifying the subterranean conduit coordinates comprises applying at least one of conduit identification parameters or an earth model filter to the seismic survey data.

9. The method of claim 1, wherein identifying the subterranean conduit coordinates comprises comparing primary wave data and shear wave data.

10. A system that comprises:
at least one seismic source;
at least one seismic receiver to collect seismic survey data in response to at least one shot fired by the at least one seismic source;
a processing unit in communication with the at least one seismic receiver;
a non-transitory machine-readable medium having instructions stored thereon, the instructions executable by the processing unit to cause the system to:
determine acoustic impedance discontinuities in a rock formation from the seismic survey data,
compare the acoustic impedance discontinuities to natural rock patterns in a model representing the rock formation,
identify subterranean conduit coordinates and a plug point coordinate for use with conduit plugging operations based on the comparison of the acoustic impedance discontinuities to the natural rock patterns in the model representing the rock formation, and
output the identified subterranean conduit coordinates and the identified plug point coordinate;
a drilling tool in communication with the processing unit, wherein the drilling tool is configured to:
receive the identified subterranean conduit coordinates from the processing unit, and
perform a conduit plugging operation using the identified subterranean conduit coordinates, the conduit plugging operation to also drill a relief well intersecting the subterranean conduit based on the received identified subterranean conduit coordinates; and
a survey tool to identify a bed boundary of interest, wherein the relief well intersects the subterranean conduit at the bed boundary of interest.

11. The system of claim 10, wherein one of the at least one seismic source and the at least one seismic receiver is positioned downhole while the other is positioned at the earth's surface.

12. The system of claim 10, wherein the at least one seismic source and the at least one seismic receiver are positioned downhole.

13. The system of claim 10, wherein the at least one seismic source and the at least one seismic receiver are positioned at the earth's surface.

14. The system of claim 10, further comprising a cementing tool to perform cementing operations via the relief well to plug the subterranean conduit.

15. The system of claim 10, further comprising a non-seismic survey tool to identify a region of interest for collecting said seismic survey data.

16. The system of claim 10, further comprising a logging-while-drilling (LWD) tool or a wireline logging tool to adjust a downhole position of the at least one seismic source or the at least one seismic receiver.

17. The system of claim 10, further comprising an active well installation in vicinity of the subterranean conduit to recover hydrocarbons after said subterranean conduit is plugged.

* * * * *